(12) United States Patent
Kozuka (10) Patent No.: US 10,440,210 B2
(45) Date of Patent: Oct. 8, 2019

(54) COMMUNICATION APPARATUS, METHOD OF CONTROLLING COMMUNICATION APPARATUS, AND STORAGE MEDIUM

(71) Applicant: CANON KABUSHIKI KAISHA, Tokyo (JP)

(72) Inventor: Yasuhiro Kozuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/824,595

(22) Filed: Nov. 28, 2017

(65) Prior Publication Data

US 2018/0084126 A1 Mar. 22, 2018

Related U.S. Application Data

(63) Continuation of application No. 15/091,486, filed on Apr. 5, 2016, now Pat. No. 98,604,078.

(30) Foreign Application Priority Data

Apr. 14, 2015 (JP) .................................. 2015-082370

(51) Int. Cl.
*H04N 1/04* (2006.01)
*H04N 1/00* (2006.01)
(Continued)

(52) U.S. Cl.
CPC ...... *H04N 1/00888* (2013.01); *H04M 3/2272* (2013.01); *H04M 19/042* (2013.01);
(Continued)

(58) Field of Classification Search
CPC ........... H04N 1/00888; H04N 1/00901; H04N 1/001; H04N 2201/0094
(Continued)

(56) References Cited

U.S. PATENT DOCUMENTS 5,267,302 A * 11/1993 Kotani ............... H04N 1/32704
379/100.15
6,035,205 A 3/2000 Han
(Continued)

FOREIGN PATENT DOCUMENTS

JP 1998-247996 * 9/1998 ............... H04N 1/00
JP 2003032398 A 1/2003

*Primary Examiner* — Houshang Safaipour
(74) *Attorney, Agent, or Firm* — Canon U.S.A., Inc. IP Division (57) ABSTRACT

A communication apparatus for performing automatic reception processing of a calling signal received on a telephone line, by power supplied from a first power supply, includes an image processing unit, a detection unit, a counting unit, and a power supply control unit. The image processing unit performs image processing on image data received over the telephone line, by power supplied from a second power supply. The detection unit detects a calling signal received on the telephone line, by power supplied from the first power supply, while power supplied from the second power supply is stopped. The counting unit counts the number of calling signals detected by the detection unit. The power supply control unit starts supply of power from the second power supply on the basis that the number of detected calling signals counted by the counting unit reaches a predetermined number.

8 Claims, 7 Drawing Sheets

(51) Int. Cl.
*H04M 3/22* (2006.01)
*H04M 19/04* (2006.01)

(52) U.S. Cl.
CPC ......... *H04N 1/001* (2013.01); *H04N 1/00901* (2013.01); *H04M 2201/12* (2013.01); *H04N 2201/0094* (2013.01); *Y02D 70/00* (2018.01)

(58) Field of Classification Search
USPC .............................................. 358/1.14, 1.15
See application file for complete search history.

(56) References Cited

U.S. PATENT DOCUMENTS

| | | | | |
|---|---|---|---|---|
| 8,984,310 B2 * | 3/2015 | Kuroishi | ............ | H04N 1/00896 713/310 |
| 2009/0296163 A1 * | 12/2009 | Koura | ................ | H04N 1/00885 358/403 |

\* cited by examiner

COMMUNICATION APPARATUS, METHOD OF CONTROLLING COMMUNICATION APPARATUS, AND STORAGE MEDIUM

CROSS-REFERENCE TO RELATED APPLICATION

This application is a continuation of, and claims the benefit of, U.S. patent application Ser. No. 15/091,486, filed Apr. 5, 2016, which claims the benefit of Japanese Patent Application No. 2015-082370, filed Apr. 14, 2015, each of which is hereby incorporated by reference herein in its entirety.

BACKGROUND OF THE INVENTION

Field of the Invention

The present invention relates to a communication apparatus, a method of controlling a communication apparatus, and a storage medium.

Description of the Related Art

In recent years, multi-functional peripherals have been widely used. Each of the multi-functional peripheral has multiple functions such as printing, copying, and the like in a facsimile device having a facsimile communication function and a phone call function. The multi-functional peripherals is configured so that in facsimile communication, an automatic call reception mode can be performed which is configured to detect a calling signal and automatically make a response, and in the automatic call reception mode, a the number of calling signals before response, that is, how many times the calling signal is to be detected before the response, can be arbitrarily set by operation of an operation unit. Furthermore, as the need for power saving is increased, the multi-functional peripherals is required to stand by while maintaining a low-power state as much as possible when not in use, return from the low-power state upon detection of the calling signal from a communication line, and response to the communication line.

In response to the requirement, an apparatus for controlling call reception during a low-power state is disclosed, which includes a call reception ringing unit, a main CPU, and a sub-CPU, and a method is known in which the main CPU controls the call reception ringing unit only when the main CPU is operated in a normal state, and the sub-CPU controls the call reception ringing unit, when the main CPU is in the low-power state or while the main CPU is returned from the low-power state to the normal state (Japanese Patent Application Laid-Open No. 2013-5037).

Furthermore, a method is also known in which when a first calling signal is detected in an automatic call reception mode, it is determined whether the detection is performed in a low-power state or a normal state, and when the detection is performed in the low-power state, the calling signals being one less in number than a set number are counted after a CPU is booted, and then response starts (Japanese Patent Application Laid-Open No. 2000-261565).

In Japanese Patent Application Laid-Open No. 2013-5037, the sub-CPU is required, and the sub-CPU always consumes large amounts of power. Thus, the cost rises with the sub-CPU.

In Japanese Patent Application Laid-Open No. 2000-261565, the response is always started after counting the calling signals one less than a value of the set number during sleep, and it is always required to ensure booting the CPU within one count.

SUMMARY OF THE INVENTION

A communication apparatus according to an embodiment of the present invention includes a configuration described below.

A communication apparatus for performing automatic reception processing of a calling signal received on a telephone line, by power supplied from a first power supply, includes an image processing unit configured to perform image processing on image data received over the telephone line, by power supplied from a second power supply, a detection unit configured to detect a calling signal received on the telephone line, by power supplied from the first power supply, while power supplied from the second power supply is stopped, a counting unit configured to count the number of calling signals detected by the detection unit, and a power supply control unit configured to start supply of power from the second power supply on the basis that the number of detected calling signals counted by the counting unit reaches a predetermined number.

The number of calling signals received is accurately counted, with an inexpensive configuration, while maintaining a low-power state upon reception of a calling signal. Further features of the present invention will become apparent from the following description of exemplary embodiments (with reference to the attached drawings).

DESCRIPTION OF THE EMBODIMENTS

Next, detailed description of preferred embodiments will be described with reference to the drawings.
<Description of System Configuration>

First Embodiment

Embodiment 1

Figure 1:
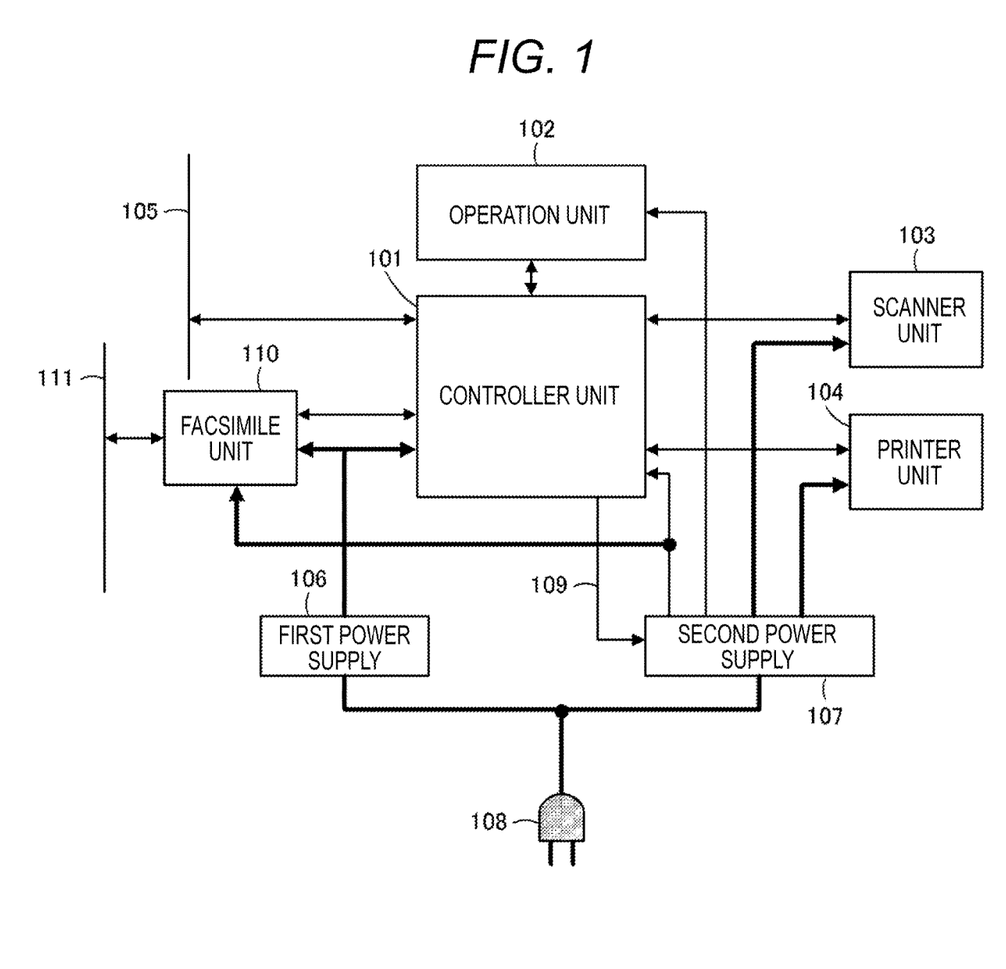
FIG. 1 is a diagram illustrating an image printing apparatus to which a facsimile communication apparatus is applied.

FIG. 1 is a diagram illustrating an image printing apparatus to which a facsimile communication apparatus according to an embodiment of the present invention is applied. The communication apparatus according to the present example performs automatic reception processing of a calling signal received on a telephone line by power supplied from a first power supply, as described later.

In FIG. 1, a controller unit is denoted by 101 which is configured to control units of the image printing apparatus. The controller unit 101 is a section controlling operation of the image printing apparatus, and performs transmission and reception, conversion, and storage of data, and power control. An operation unit is denoted by 102, and includes an operation panel configured to receive various operations from a user, and a display device configured to display operational information. A scanner unit is denoted by 103, and scans an image and inputs the image to the controller unit 101. A printer unit is denoted by 104, and prints and outputs various types of input images processed by the controller unit 101. A network is denoted by 105, and a LAN is assumed in the present embodiment.

The first power supply 106 and a second power supply 107 are power supplies each configured to convert a commercial AC power source supplied from a power plug 108 to DC voltage used for the units of the image printing apparatus. The second power supply 107 outputs power controlled by a power supply control signal 109 output from the controller unit 101. A facsimile unit is denoted by 110, and connected to an external telephone or a facsimile apparatus over the telephone line 111.

In a normal mode, both of the first power supply 106 and the second power supply 107 are turned on, but in an energy saving mode, the second power supply 107 is turned off. Here, the energy saving mode represents a state in which, when the apparatus does not perform job processing, power feeding to portions is stopped partially excluding the controller unit 101 and the facsimile unit 110, in order to reduce consumption of power from the commercial power source. In the energy saving mode, reception of a job can be detected in the controller unit 101. Upon the detection, the power supply control signal 109 is switched to transition to the normal mode, and the second power supply 107 is turned on.

Figure 2:
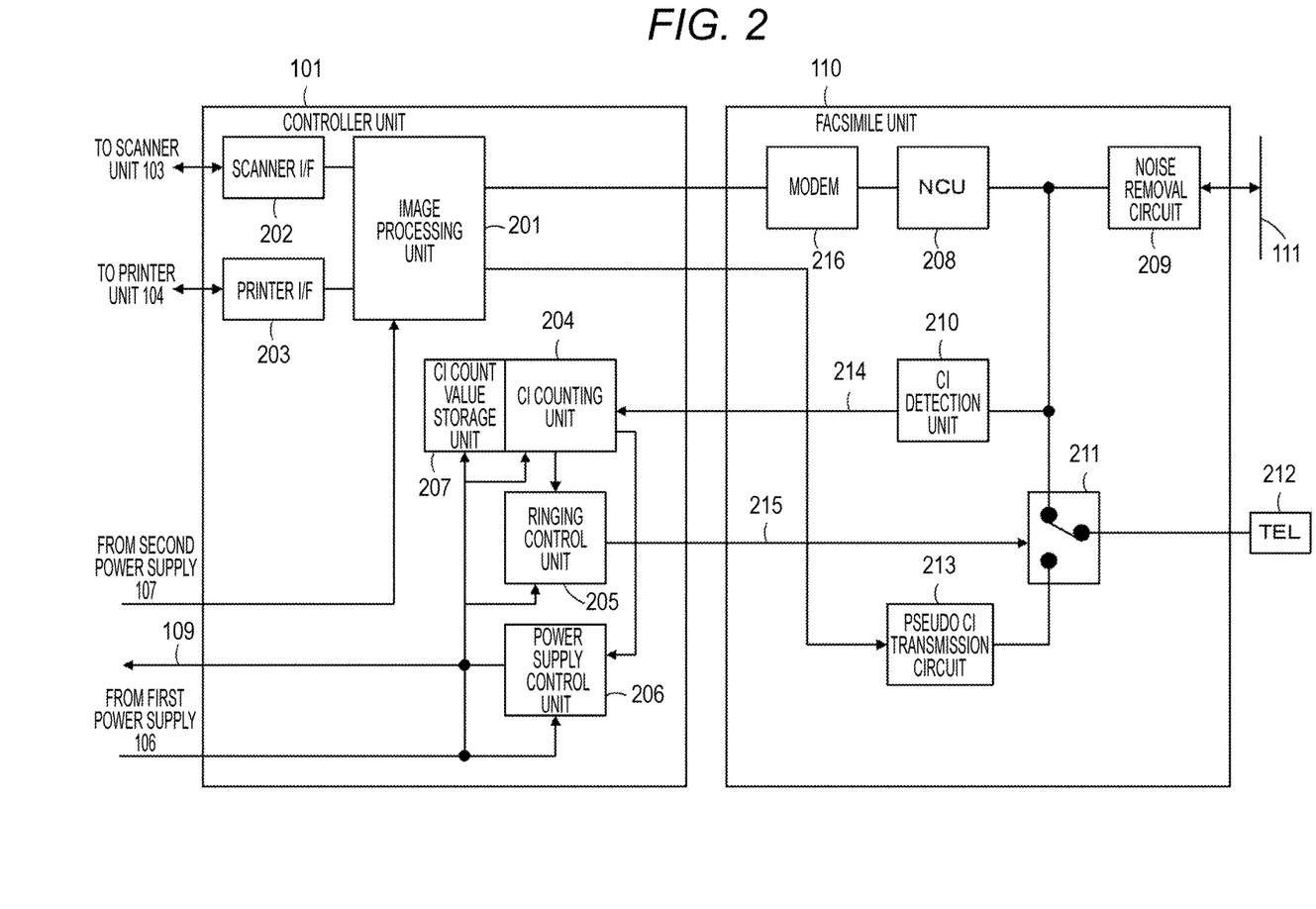
FIG. 2 is a block diagram illustrating a controller unit and a facsimile unit.

FIG. 2 is a block diagram illustrating a configuration of the controller unit 101 and the facsimile unit 110 illustrated in FIG. 1.

In FIG. 2, an image processing unit 201 internally has a control CPU, exchanges or controls data for an objective unit, according to a processing mode of copying, printing, facsimile, or the like, and performs desired image processing on image data. A scanner I/F 202 and a printer I/F 203 represent I/Fs for connection to the scanner unit 103 and the printer unit 104, respectively.

A CI counting unit is denoted by 204, is a CI used for counting a CI reception signal upon facsimile or telephone reception, and has a hardware counter in the present embodiment. A ringing control unit is denoted by 205, and stops the ringing of an external handset caused by the reception of the CI. A power supply control unit is denoted by 206, which performs various power supply control in a system, and is operated by power supplied from the first power supply 106. Furthermore, the second power supply 107 is controlled by the power supply control signal 109. A CI count value storage unit is denoted by 207, and stores a set ring count value in an automatic call reception mode, set by the user from the operation unit 102.

Next, description will be made of a schematic block diagram of the inside of the facsimile unit 110.

In the facsimile unit 110, a modem 216 is a modulator/demodulator connected to the image processing unit 201, and operated based on control by the image processing unit 201. A network control unit (NCU) is denoted by 208, and transmits and receives a dialing signal over the telephone line 111 to call a communication partner. Note that, the NCU 208 may be included in the modem 216.

A noise removal circuit 209 is a circuit configured to suppress lightning surge, electromagnetic noise, or the like from the external telephone line 111, and prevent external transmission of noise from the facsimile unit 110.

A CI detection unit 210 detects the calling signal (hereinafter, referred to as CI signal) received from the telephone line 111. When detecting the CI signal from the telephone line 111, the CI detection unit 210 transmits a CI detection signal 214 representing the detection of the CI signal, to the CI counting unit 204. An H relay 211 is a relay switch circuit configured to selectively connect the connected external telephone 212 to signal input from the telephone line 111 through the noise removal circuit 209, or signal input from the pseudo CI transmission circuit 213. Furthermore, the H relay 211 is controlled by the ringing control unit 205, using an H relay control signal 215.

Note that, when the H relay 211 is connected to the telephone line 111 side, the external telephone 212 is rung by power fed from the telephone line 111, and when the H relay 211 is not connected to the telephone line 111, even if the CI signal is received, the telephone 212 is not rung.

The pseudo CI transmission circuit 213 is a circuit configured to transmit a pseudo CI signal to the telephone 212. The pseudo CI signal is a signal transmitted to the telephone 212 to ring the telephone 212 being disconnected from the telephone line, when the CI is received from a calling party device over the telephone line 111.

Note that, in the present embodiment, the normal state represents a state in which power supply voltages from the first power supply 106 and the second power supply 107 are supplied to devices. Upon transition to a low-power state, power supplied from the second power supply 107 is turned off by control of a power supply control unit 206. However, the first power supply 106 and the second power supply 107 each inclusively represent a plurality of types of power supplies, power supplies supplying power even in the low-power state are defined as the first power supply 106, and power supplies turned off in the low-power state are defined as the second power supply 107.

[Example of Communication Control by Power Priority Setting]

Figure 3A:
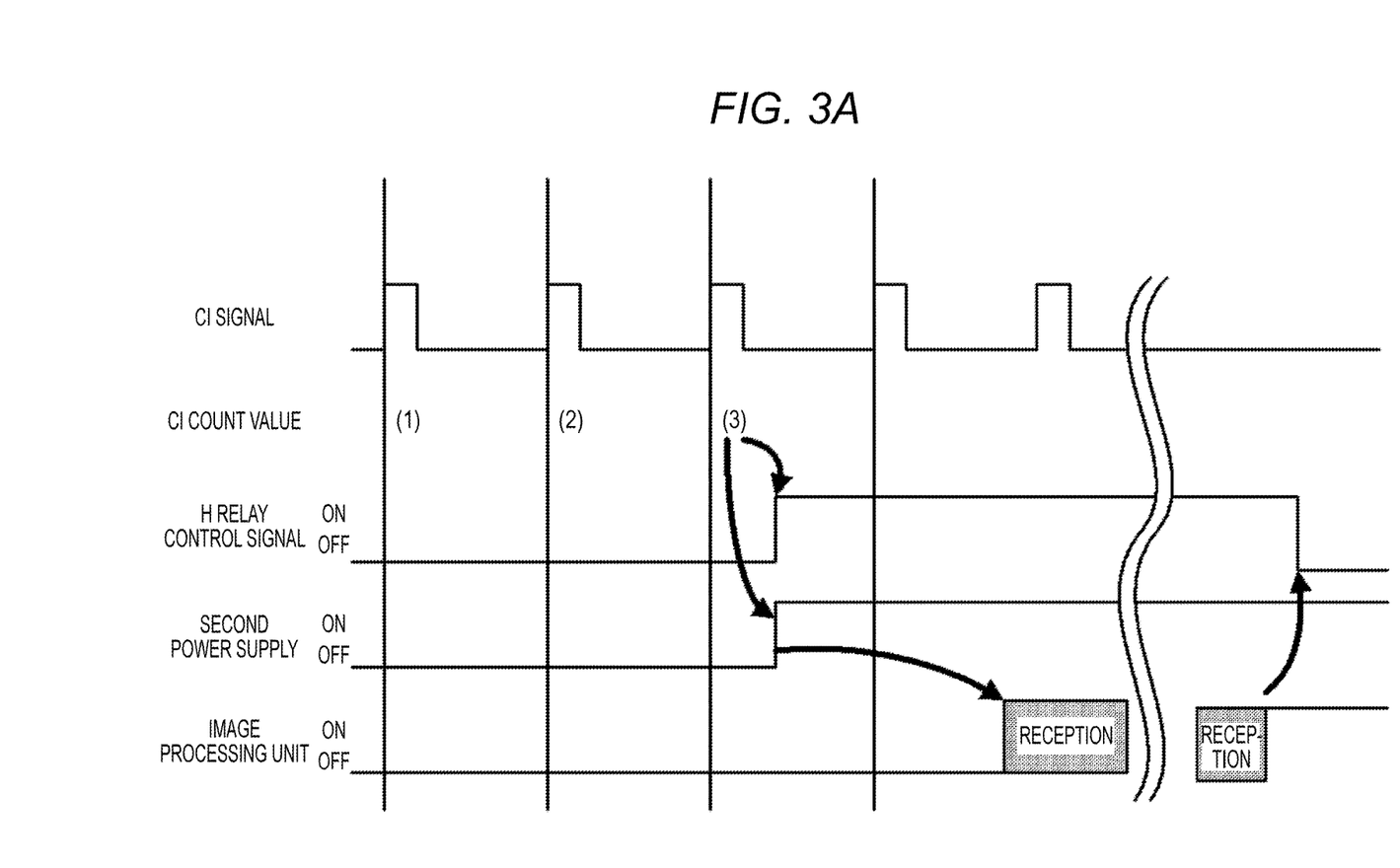
FIGS. 3A and 3B are timing charts illustrating operations of the communication apparatus.

Next, operation performed from first calling signal detection to response in the above apparatus configuration, will be described using a timing chart illustrated in FIG. 3A. The operation is performed during a stand-by time with low power, when the facsimile is set to an automatic call reception mode.

Note that, in the present embodiment, a call count in the automatic call reception mode is previously set to three from the operation unit 102, and the call count (=3) is stored in the CI count value storage unit 207.

When the CI detection unit 210 detects the CI signal, and transmits the CI detection signal 214 to the CI counting unit 204, the CI counting unit 204 starts counting up. Then, the CI counting unit 204 continues counting up, until a count value (detection count) coincides with the value (predetermined number) stored in the CI count value storage unit 207. When the count value is counted up to the set value, notification of count termination is transmitted to the ringing control unit 205.

The ringing control unit 205 turns on the H relay control signal 215 switches the H relay 211 to the side of the pseudo CI transmission circuit 213, blocks the CI reception signal from the telephone line 111 side to the external telephone 212 and stops the ringing.

The CI counting unit 204 simultaneously sends the notification of count termination also to the power supply control unit 206, and the power supply control unit 206 controls the power supply control signal 109 to turn on the second power supply 107, and supplies power from the second power supply 107 to the image processing unit 201. The CPU in the image processing unit 201 performs initialization processing during a predetermined time after the power supply from the second power supply 107, and then controls the modem 216 to start facsimile reception.

After the reception, a count value register and a ringing control unit control register, not illustrated, in the CI counting unit 204 are cleared, the H relay control signal 215 output from the ringing control unit 205 is turned off, and the H relay 211 is returned to the telephone line 111 side.

Figure 3B:
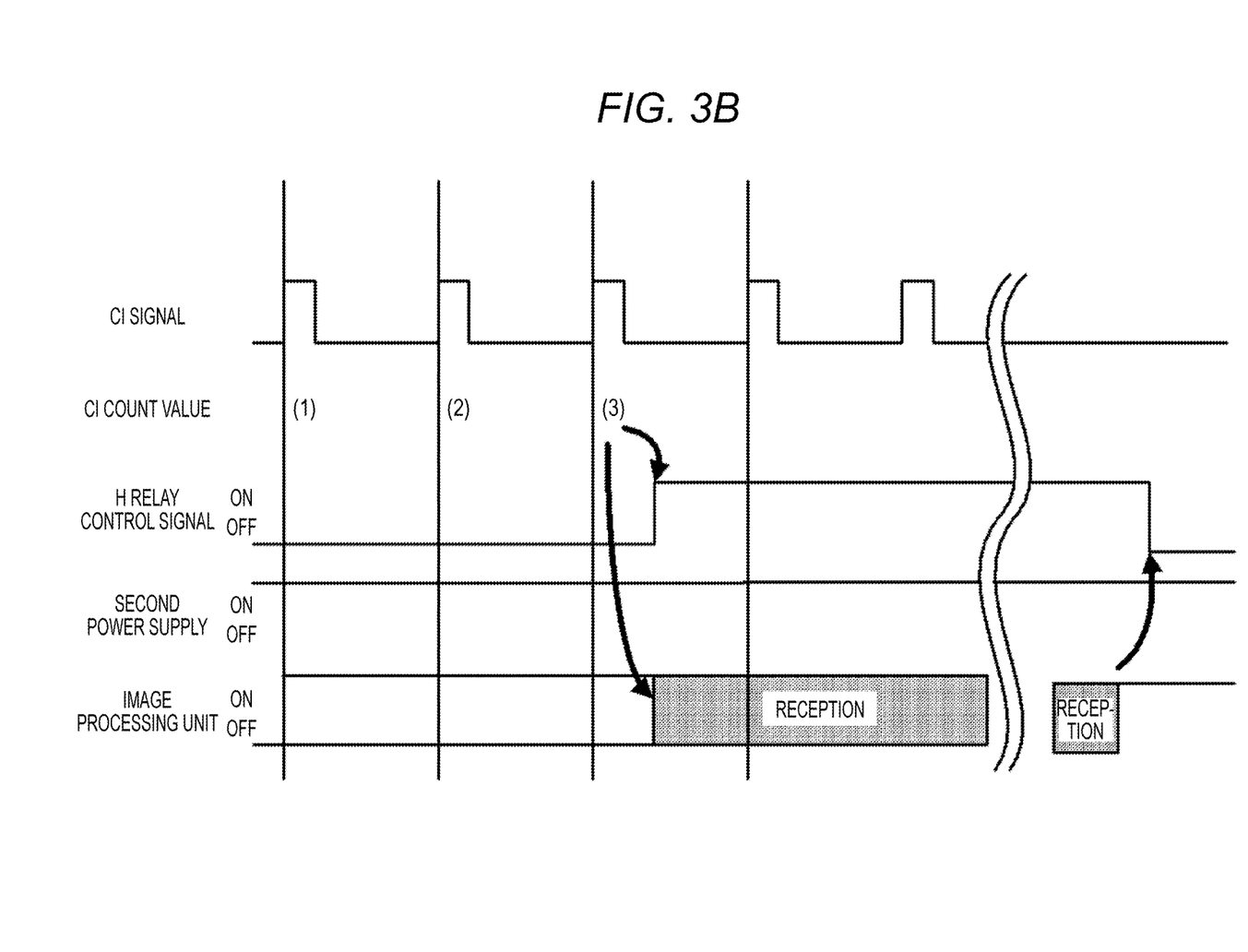

Operation performed from calling signal detection to response in the normal state is illustrated in FIG. 3B. In this configuration, the second power supply 107 is already turned on and the image processing unit 201 is in an activated state, and thus, immediately after the CI counting unit 204 detects the CI signals and counts up the predetermined count value, the image processing unit 201 can receive the image data.

Figure 4A:
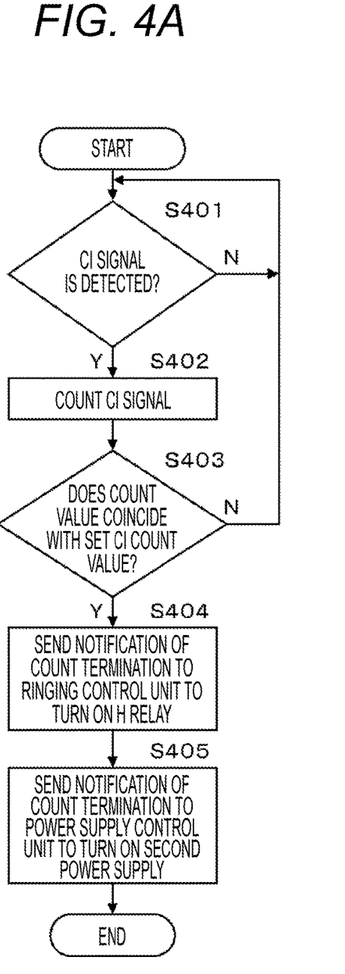
FIGS. 4A and 4B are flowcharts illustrating a method of controlling a communication apparatus.
Figure 4B:
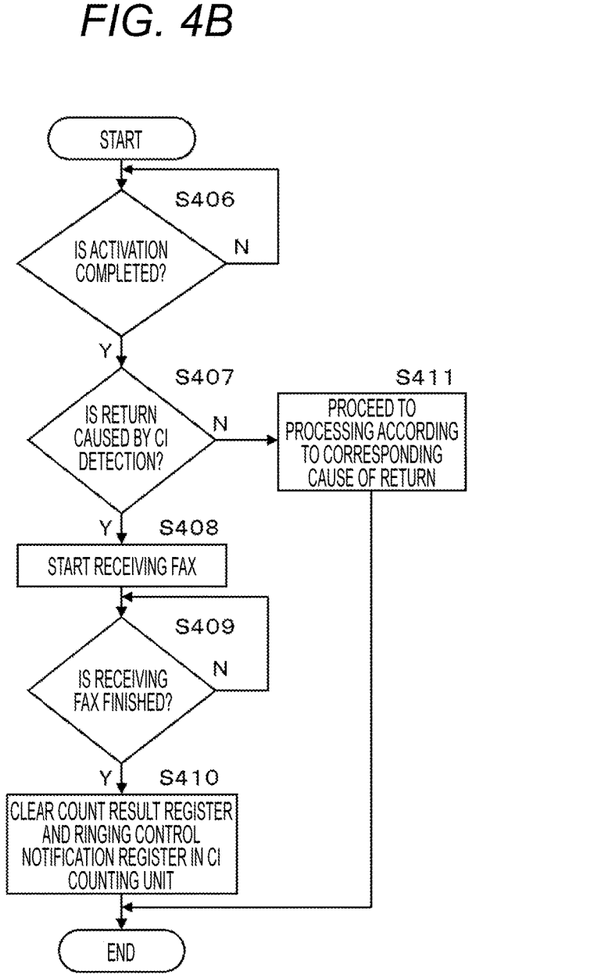

FIGS. 4A and 4B are flowcharts illustrating a method of controlling a communication apparatus according to the present embodiment. In particular, an example of communication processing relating to a hardware sequencer of the CI counting unit 204 according to the present embodiment is illustrated in FIG. 4A. Note that, the flowchart of FIG. 4A has steps each corresponding to processing performed by the hardware sequencer of the CI counting unit 204.

In S401, when the CI counting unit 204 determines the reception of the CI detection signal 214 from the CI detection unit 210, the process proceeds to S402 to start counting the CI signal. In S403, counting up is continued until the count value coincides with the value (=3) stored in the CI count value storage unit 207, and when the count value coincides with the stored value, the process proceeds to S404. In S404, the notification of count termination is sent to the ringing control unit 205, the ringing control unit 205 is caused to turn on the H relay 211, and the CI signal from the telephone line 111 to the external telephone 212 is blocked to stop the ringing.

Then, the process proceeds to S405, the notification of count termination is sent to the power supply control unit 206, the second power supply 107 is turned on by the power supply control signal 109, power is supplied from the second power supply 107 to the image processing unit 201, the image processing unit 201 is activated, and the process ends.

Next, an example of control of the CPU included in the image processing unit 201 of FIG. 2 is illustrated in FIG. 4B. Note that, the flowchart of FIG. 4B has steps achieved by execution of a control program stored in the CPU in the controller unit 101.

In S406, after power is supplied from the second power supply 107 to the image processing unit 201 to complete the booting of the CPU on the inside, the process proceeds to S407. In S407, the CPU on the inside reads a return cause register, not illustrated, of the CI counting unit 204, and determines whether returning is caused by detection of the CI. Here, when the CPU determines that the returning is caused by the CI detection signal, the process proceeds to S408, and the modem 216 is controlled to start facsimile reception.

In contrast, when the CPU determines that the returning is not caused by the CI detection signal, in S407, the process proceeds to S411 to perform processing according to a corresponding cause of the returning, and the process ends.

When the facsimile reception is determined to be finished, in S409, the process proceeds to S410. In S410, the CPU clears a count result register and a ringing control notification register in the CI counting unit 204. Then, the CPU turns off the H relay control signal 215 to return the H relay 211 to the telephone line 111 side, and when a next CI signal is generated from the telephone line 111, the telephone can be rung again.

According to the present embodiment, the communication apparatus has a hardware counter having a simple configuration to count the reception signal even in the low-power state, accurately counts the ringing, and then returns from the low-power state to the normal state. Thus, the communication apparatus can accurately count the ringing while maintaining the low-power state.

Second Embodiment

In the present embodiment, the automatic call reception mode has power priority setting configured to give a priority to reduce power consumption, and activation time priority setting configured to give a priority to reduce an activation time. Thus, the user can have desired setting through key input from the operation unit 102.

Here, description of the power priority setting is similar to the first embodiment, and repetitive description will be omitted. Furthermore, an example of an internal configuration of the image printing apparatus and an internal schematic block diagram of the image printing apparatus are similar to FIGS. 1 and 2 of Embodiment 1, and repetitive description will be omitted.

[Example of Communication Control by Activation Time Priority Setting]

Figure 5:
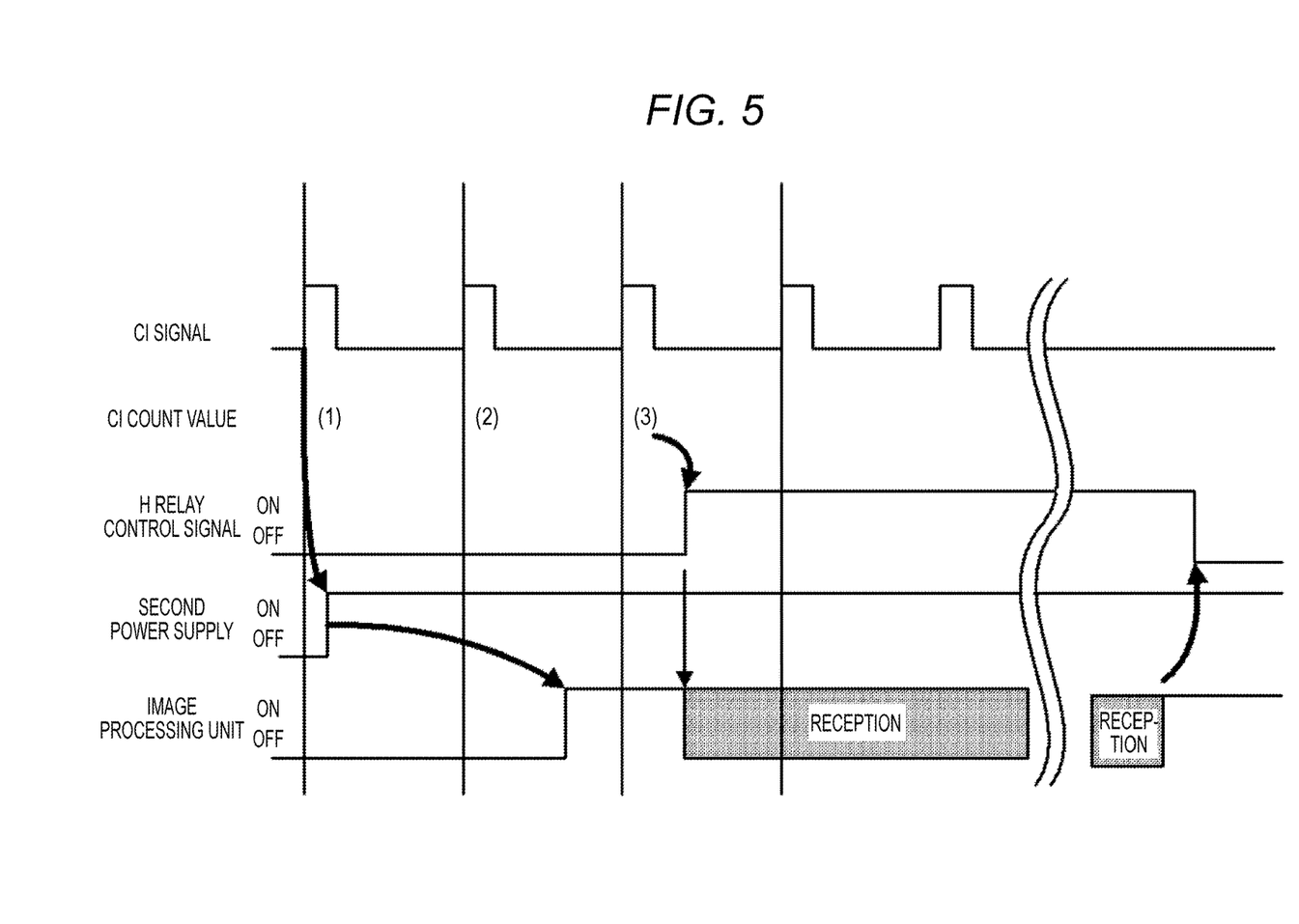
FIG. 5 is a timing chart illustrating an operation of the communication apparatus.

FIG. 5 is a timing chart illustrating a method of controlling a communication apparatus according to the present embodiment. An example of timing when the activation time priority setting is set is described in the present example. Note that, in the present embodiment, a call count in the automatic call reception mode is previously set to three from the operation unit 102, and the call count is stored in the CI count value storage unit 207. It should be considered that processing is performed determining that a current time corresponds to the activation time priority setting.

When the CI detection unit 210 detects the CI signal, and transmits the CI detection signal 214 to the CI counting unit 204, the CI counting unit 204 starts counting up. At the same time, the CI counting unit 204 sends first CI reception notification to the power supply control unit 206, and the power supply control unit 206 controls the power supply control signal 109 to turn on the second power supply 107, and supplies power from the second power supply 107 to the image processing unit 201. The CPU in the image processing unit 201 performs initialization processing during a predetermined time after the power supply from the second power supply 107.

In contrast, the CI counting unit 204 continues counting up, until the count value coincides with the value (=3) stored in the CI count value storage unit 207.

When the count value is counted up to the set value, the H relay control signal 215 is turned on to switch the H relay 211 to the side of the pseudo CI transmission circuit 213. Thus, the CI reception signal from the telephone line 111 side to the external telephone 212 is blocked to stop the ringing. At this time, when the initialization is finished, the image processing unit 201 promptly controls the modem 216, and starts facsimile reception.

After the reception, the CPU in the image processing unit 201 clears the count value register and the ringing control unit control register, not illustrated, in the CI counting unit 204, and returns the count value in the CI counting unit 204 to "0". Thus, the H relay control signal 215 is turned off, and the H relay 211 is returned to the telephone line 111 side.

Figure 6A:
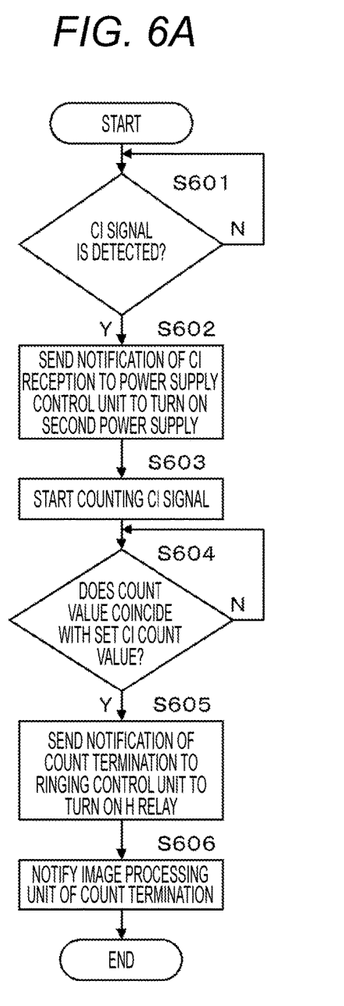
FIGS. 6A and 6B are flowcharts illustrating a method of controlling a communication apparatus.
Figure 6B:
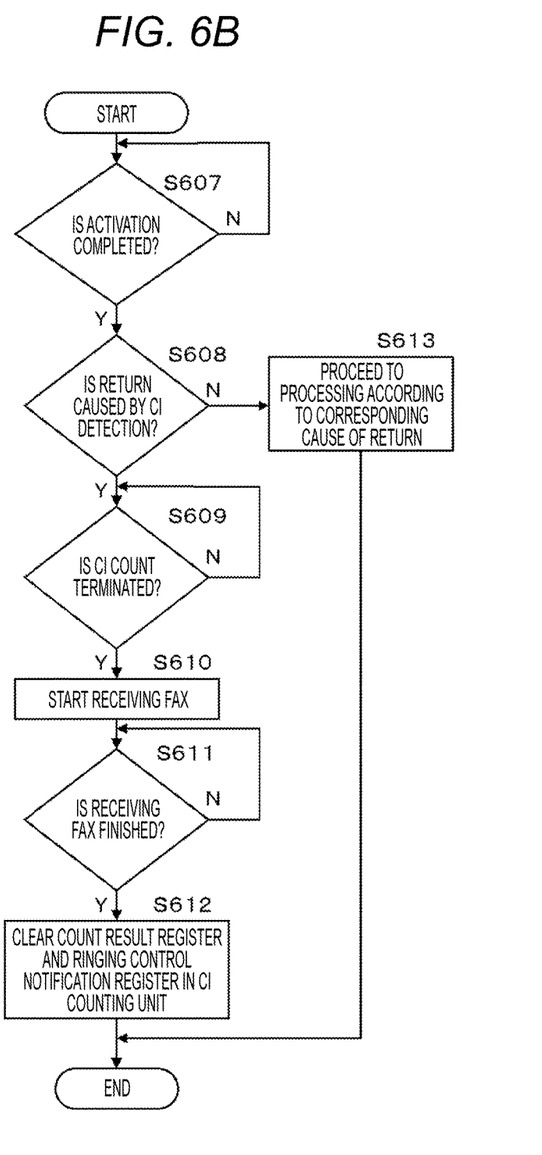

FIGS. 6A and 6B are flowcharts illustrating a method of controlling a communication apparatus according to the present embodiment. In particular, an example of communication processing relating to the hardware sequencer of the CI counting unit 204 according to the present embodiment is illustrated in FIG. 6A. Note that the flowchart of FIG. 6A has steps corresponding to processing of the hardware sequencer of the CI counting unit 204.

In S601, when the CI counting unit 204 receives the CI signal from the CI detection unit 210, the process proceeds to S602, notification of CI signal reception is sent to the power supply control unit 206, and the second power supply 107 is turned on by the power supply control signal 109. Then, power is supplied from the second power supply 107 to the image processing unit 201 to activate the image processing unit 201. Furthermore, in S603, counting the CI signals is started. In S604, counting up is continued until the count value coincides with the value (=3) stored in the CI count value storage unit 207, and when the CI counting unit 204 determines that the count value coincides with the value, the process proceeds to S605, and the notification of count termination is sent to the ringing control unit 205.

After the notification of count termination is sent, the ringing control unit 205 turns on the H relay 211, blocks the CI signal from the telephone line 111 to the external telephone 212, and stop the ringing. Then the process proceeds to S606, the notification of count termination is sent to the image processing unit 201, and the process ends.

Next, FIG. 6B corresponds to an example of control of the CPU included in the image processing unit 201 according to the present embodiment.

In S607, power is supplied from the second power supply 107 to the image processing unit 201 to complete the booting of the CPU on the inside, and then, in S608, the CPU on the inside reads the return cause register, not illustrated, of the CI counting unit 204, and determines whether returning is caused by detection of the CI. When the CPU determines that the returning is caused by the CI detection signal, the process proceeds to S609 to stand by until notification of CI count termination is received from the CI counting unit 204.

In contrast, when the CPU determines that the returning is not caused by the CI detection signal, in S608, the process proceeds to S613 to perform processing according to a corresponding cause of the returning, and the process ends.

When the notification of CI count termination is received in S609, the process proceeds to S610, and the modem 216 is controlled to start facsimile reception.

When the facsimile reception is determined to be finished, in S611, the process proceeds to S612, and the CPU clears the count result register and the ringing control notification register in the CI counting unit 204, and turns off the H relay control signal 215. Thus, the H relay 211 is returned to the telephone line 111 side, and when a next CI signal is generated from the telephone line 111, the telephone can be rung again.

According to the present embodiment, the communication apparatus has a hardware counter having a simple configuration to count the reception signal even in the low-power state, accurately counts the ringing, even if the CPU of a reception unit has the low-power state and then returns from the low-power state to the normal state.

Thus, the number of times of reception and ringing can be accurately counted, and, in addition to that, the low-power state can be maintained during the stand-by time.

Furthermore, the power priority setting for booting from the low-power state after counting the CI, or the activation time priority setting for booting from the low-power state immediately after reception of the CI can be selected according to the user's taste, and thus, user's convenience can be improved, According to the embodiments, when the calling signal emitted by mistake is received during the low-power state, power supply to the image processing unit can be inhibited, and the low-power state can be accurately maintained.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-082370, filed Apr. 14, 2015, which is hereby incorporated by reference herein in its entirety.

What is claimed is:

1. A facsimile apparatus capable of operating in an automatic reception mode in which reception of facsimile data is able to be automatically started, the facsimile apparatus comprising:
a central processing unit (CPU);
a power supply controller configured to control power supply to the CPU;
a modem;
a detector configured to detect a calling signal received via a telephone line; and
a counter configured to count a number of calling signals detected by the detector,
wherein the power supply controller starts power supply to the CPU according to detection of a first calling signal by the detector in a state that power supply to the CPU is restricted,
wherein the counter counts the number of calling signals after power supply to the CPU is started by the power supply controller and before start processing of the CPU is completed, and
wherein the facsimile apparatus performs control to receive facsimile data by the modem in a case where the number of the calling signals counted by the counter reaches a predetermined number.

2. The facsimile apparatus according to claim 1, further comprising:
   a connecter configured to connect to a telephone, wherein the telephone rings in accordance with a detection of the calling signal by the detector; and
   a ringing controller configured to stop ringing of the telephone in a case where the number of the calling signals counted by the counter reaches the predetermined number.

3. The facsimile apparatus according to claim 1, wherein the CPU is connected to the modem.

4. The facsimile apparatus according to claim 2, further comprising a relay,
   wherein the ringing controller switches the relay to receive facsimile data by the modem in a case where the number of the calling signal reaches a predetermined number.

5. The facsimile apparatus according to claim 1, wherein the power supply controller operates according to power supplied from a first power supply and supplies power to the CPU from a second power supply different from the first power supply.

6. The facsimile apparatus according to claim 1, wherein power consumption by the first power supply is smaller than power consumption by the second power supply.

7. A control method for controlling a facsimile apparatus capable of operating in an automatic reception mode in which reception of facsimile data is able to be automatically started, wherein the facsimile apparatus includes a central processing unit (CPU), a power supply controller configured to control power supply to the CPU, a modem, a detector, and a counter, the control method comprising:
   detecting, via the detector, a calling signal received via a telephone line; and
   counting, via a counter, a number of calling signals detected by the detector,
   wherein the power supply controller starts power supply to the CPU according to detection of a first calling signal by the detector in a state that power supply to the CPU is restricted,
   wherein the counter counts the number of calling signals after power supply to the CPU is started by the power supply controller and before start processing of the CPU is completed, and
   wherein the facsimile apparatus performs control to receive facsimile data by the modem in a case where the number of the calling signals counted by the counter reaches a predetermined number.

8. A non-transitory computer-readable storage medium storing a program to cause a computer to perform a control method for controlling a facsimile apparatus capable of operating in an automatic reception mode in which reception of facsimile data is able to be automatically started, wherein the facsimile apparatus includes a central processing unit (CPU), a power supply controller configured to control power supply to the CPU, a modem, a detector, and a counter, the control method comprising:
   detecting, via the detector, a calling signal received via a telephone line; and
   counting, via a counter, a number of calling signals detected by the detector,
   wherein the power supply controller starts power supply to the CPU according to detection of a first calling signal by the detector in a state that power supply to the CPU is restricted,
   wherein the counter counts the number of calling signals after power supply to the CPU is started by the power supply controller and before start processing of the CPU is completed, and
   wherein the facsimile apparatus performs control to receive facsimile data by the modem in a case where the number of the calling signals counted by the counter reaches a predetermined number.

* * * * *